Aug. 25, 1936.  J. L. MUSGRAVE  2,052,359
HEATING AND COOLING OF BUILDINGS
Filed June 26, 1935   3 Sheets-Sheet 1

Inventor
JOSEPH LESLIE MUSGRAVE
By Eugene E. Stevens
ATTY.

Aug. 25, 1936.  J. L. MUSGRAVE  2,052,359
HEATING AND COOLING OF BUILDINGS
Filed June 26, 1935   3 Sheets-Sheet 2

Inventor
JOSEPH LESLIE MUSGRAVE
By Eugene E. Stevens
ATTY.

Aug. 25, 1936.                J. L. MUSGRAVE                2,052,359
                    HEATING AND COOLING OF BUILDINGS
                    Filed June 26, 1935        3 Sheets-Sheet 3

Inventor
JOSEPH LESLIE MUSGRAVE
By Eugene E. Stevens
ATTY.

Patented Aug. 25, 1936

2,052,359

UNITED STATES PATENT OFFICE 2,052,359

HEATING AND COOLING OF BUILDINGS

Joseph Leslie Musgrave, London, England

Application June 26, 1935, Serial No. 28,577
In Great Britain June 13, 1934

1 Claim. (Cl. 257—8)

This invention refers to the system of heating or cooling buildings in which a heating or cooling fluid is caused to circulate through a system of pipes embedded in the material forming the walls, floors or ceilings of such building, and in particular refers to that system of heating or cooling known as panel heating, the object of the invention is to devise means whereby the heat or cold, emanating from the pipes through which the fluid is circulated, is increased, and is more evenly diffused or caused to spread over the material in which the pipes are embedded so that the heat, which radiates from or is absorbed at the surface of such material, is maintained practically at the same temperature between the rows of pipes as that adjacent to said pipes.

According to this invention before or after the pipes, in which the heating or cooling fluid is circulated, have been laid in position on the "shuttering" or "centering" upon which they are supported and prior to pouring in the concrete or other material in which they are to be embedded, I place a number of rods or strips or tubes of high conductivity at suitable intervals apart, across the rows of pipes, and in order to ensure perfect contact with each pipe and enable such rods or strips or tubes to act as transverse thermic conductors I secure said rods or strips or tubes to the pipes either by wiring, spot welding or by staples driven into the "shuttering" or "centering" or by other means. If desired the rods, tubes or strips may lie flat across the upper or lower surface of the pipes in an horizontal plane or between said pipes. Or such rods or strips or tubes may be made to partially or wholly wrap round said pipes.

In order that the invention may be clearly understood I have appended the accompanying sheets of drawings.

A represents the pipes through which the heating or cooling fluid is circulated, B the rods of high conductivity which are secured transversely across the pipes A, D the concrete or other material in which the pipes A and rods B are embedded, E the plaster which is laid over the surface of the concrete after the "shuttering" or "centering" is removed, and F the finishing plaster which forms the surface from which the heat radiates.

In all the examples illustrated I have shown rods as representing the transverse thermic conductors, although strips or tubes of high conductivity may be employed.

Figure 1:
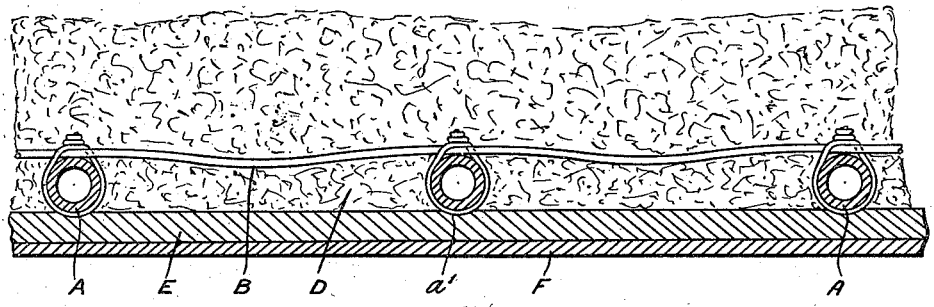
Figs. 1, 2, 6 and 7 show various methods of securing the rods, strips or tubes of high conductivity, at suitable intervals apart, transversely across the rows of pipes by wiring.
Figure 7:
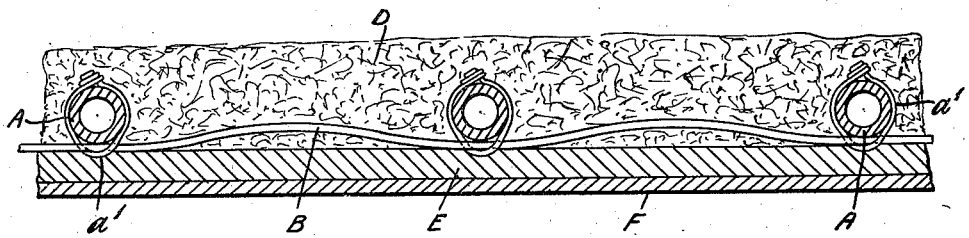
Figure 8:
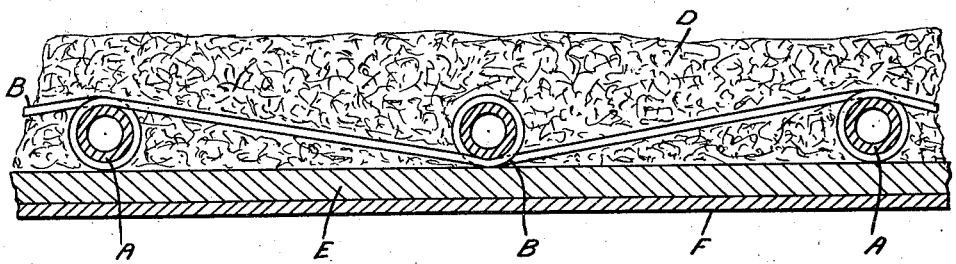

Referring to Fig. 1 the rods B, which are laid flat across the top of the pipes A and curved slightly outwards between each row of pipes, are secured to such pipes A by wires $a^1$, whereas in Fig 7 the pipes A rest on the rods B, said rods being curved inwardly between the rows of pipes to which they are secured by the wires $a^1$.

Figure 2:
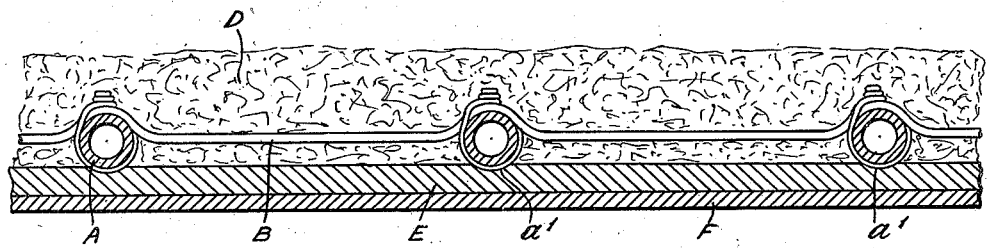
Figure 3:
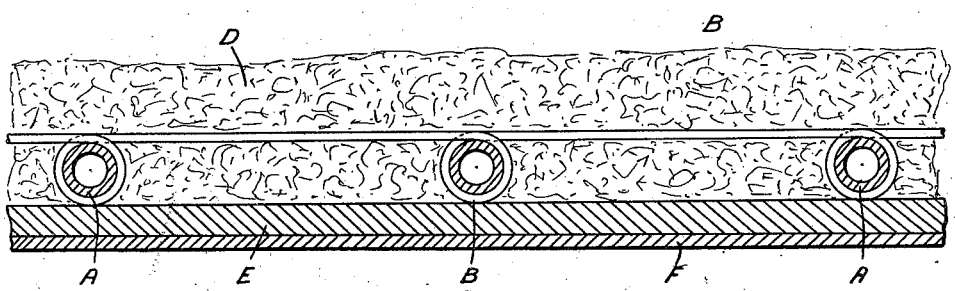
Figs. 3, 4, 5 and 8 show how the rods, strips or tubes may be made to partially or wholly wrap round the pipes.
Figure 6:
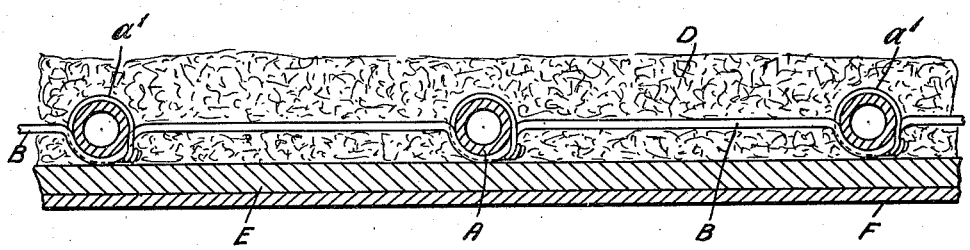

In the examples illustrated by Figs. 2 and 6, the rods B before being tied to the pipes A by the wires $a^1$, are bent to wrap half way round each pipe, the bend, as shown by Fig. 2, passing around the upper half of each pipe, and around the lower half as shown by Fig. 6, the rods then extending centrally across between each row of pipes.

Figure 4:
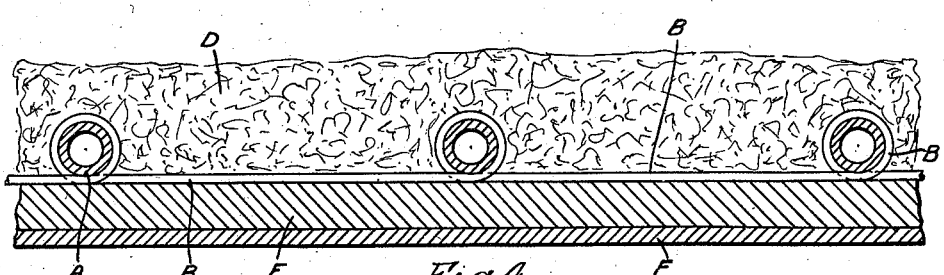
Figure 5:
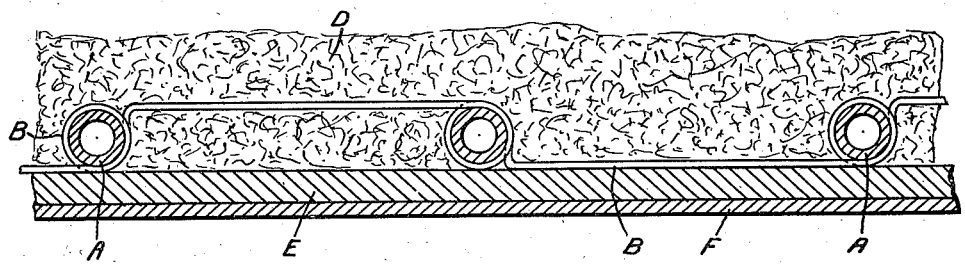

As illustrated by Figs. 3, 4, 5 and 8, the rods B are secured to the pipes A by being wrapped or wound entirely around each pipe. In the example shown by Fig. 3, the rods, after being wrapped or wound round the first pipe passes over the top of this pipe to the next pipe around which it is wound, and so on throughout the rows of pipes, whereas as shown by Fig. 4, the rods B are wound round the first pipe and pass from the underside of this pipe around the next pipe to the succeeding pipes in a similar manner. In the example shown by Fig. 5, the rods B are wound or wrapped around the pipes A so that the portion of each rod spanning the rows of pipes lies alternately between the one row horizontally with the top of the pipes, and between the succeeding row horizontally with the underside of said pipes, but in the example shown by Fig. 8 the rods are wound round the pipes A so as to pass in an inclined direction alternately under and over each succeeding row of pipes.

Figure 9:
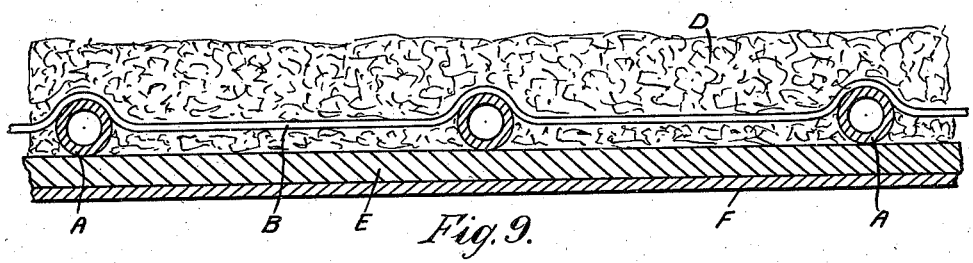
Figs. 9, 10 and 11 show different methods of securing the rods, strips or tubes transversely across the pipes by spot welding.
Figure 10:
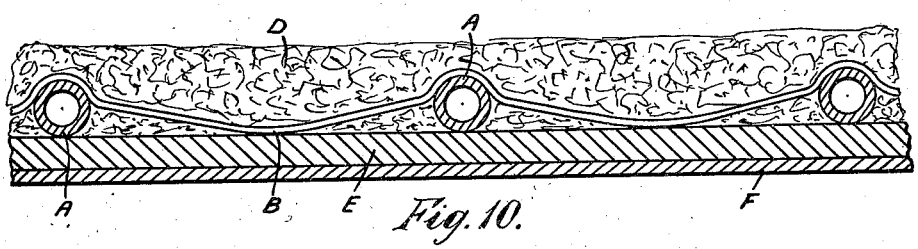
Figure 11:
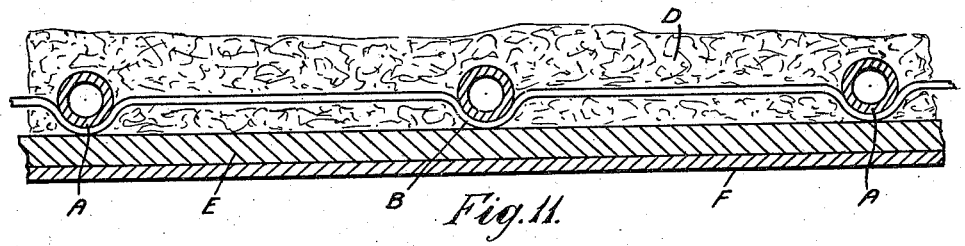
Figure 13:
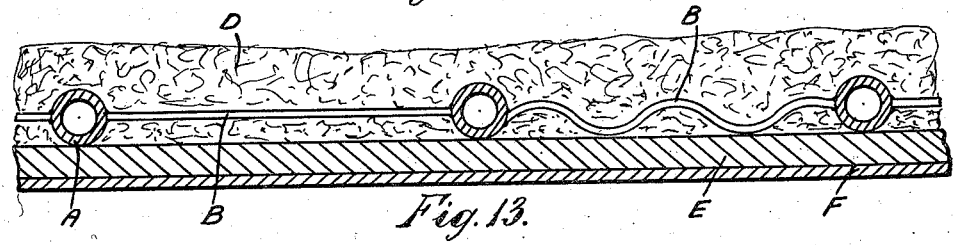
Fig. 13 shows how the rods, strips or tubes, whether straight, curved or corrugated, may be butted between adjacent pipes to which said rods are spot welded.

In the examples illustrated by Figs. 9, 10 and 11, the rods B are bent so as to partially surround the pipes A practically in a similar manner as shown by Figs. 2 and 6, but instead of the rods being fixed to the pipes by wiring, said rods are secured to the pipes A by spot welding or the like. Or the rods B may butt between adjacent pipes, as shown by Fig. 13, to each of which they are welded, and such rods may be straight, curved or corrugated.

Figure 12:
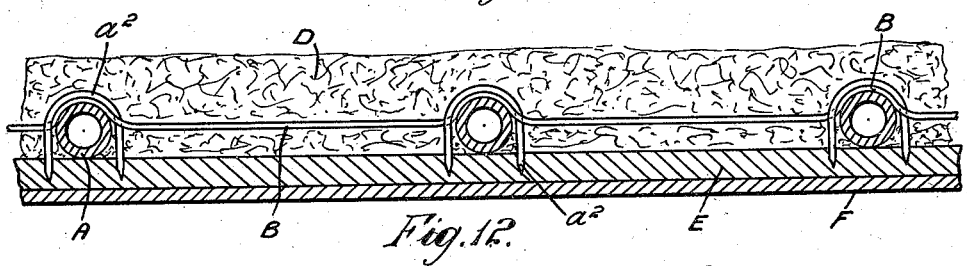
Fig. 12 shows how the rods, strips or tubes may be secured transversely across the pipes by staples.

At Fig. 12 I have shown an example of how the rods B may be secured to the pipes A by staples $a^2$. When the pipes are placed in position on the "shuttering" or "centering", the rods B may either be placed horizontally across the rows of pipes, or said rods may be bent to partially embrace said pipes as shown. The staples $a^2$ are then driven into the "shuttering" or "centering", thus firmly holding the rods in position, and after the concrete, in which the pipes and rods are embedded, has set and the "shuttering" or "centering" removed, the ends of the staples are embedded in the plaster E with which the surface of the concrete is covered before the finishing plaster F is laid on.

By the use of thermic conductors arranged transversely across the pipes in which the heating or cooling fluid is caused to circulate it will be evident, as the heat or cold emanating from such pipes is increased and is more evenly distributed or diffused between the rows of pipes, that the number of such rows of pipes over a given area can be reduced. It is also apparent that the heat radiating from the surface of the material in which the pipes are embedded is maintained practically at the same temperature between such rows of pipe as that adjacent to said pipes.

What I claim as my invention and desire to secure by Letters Patent is:—

In a system of heating or cooling the interior of buildings, a panel structure comprising a plurality of spaced parallel pipes through which a heating or cooling fluid is circulated, a plurality of metal elements of high thermic conductivity arranged in spaced parallel rows across and between said pipes, said elements being continuous from end to end and physically contacting said pipes, a plastic setting material surrounding all of said pipes and thermic conductor elements and embedding the same, a facing layer of plastic setting material disposed over the body of said first named plastic setting material, and staples securing said elements to said pipes, said staples having their ends extending into and anchored in the said facing layer.

JOSEPH LESLIE MUSGRAVE.